US00RE41599E

(19) United States
(12) Reissued Patent
Isham

(10) Patent Number: US RE41,599 E
(45) Date of Reissued Patent: Aug. 31, 2010

(54) METHOD OF SETTING BI-DIRECTIONAL OFFSET IN A PWM CONTROLLER USING A SINGLE PROGRAMMING PIN

(75) Inventor: Robert H. Isham, Flemington, NJ (US)

(73) Assignee: Intersil Americas Inc., Milipitas, CA (US)

(21) Appl. No.: 12/254,450

(22) Filed: Oct. 20, 2008

Related U.S. Patent Documents

Reissue of:
(64) Patent No.: 6,703,893
Issued: Mar. 9, 2004
Appl. No.: 10/303,253
Filed: Nov. 25, 2002

(51) Int. Cl.
*G05F 1/10* (2006.01)

(52) U.S. Cl. ..... 327/538; 327/539; 323/318
(58) Field of Classification Search ..... 327/538, 327/539, 534, 537, 530, 545; 323/350, 318
See application file for complete search history.

(56) References Cited

U.S. PATENT DOCUMENTS 3,989,997 A 11/1976 Ahmed
4,523,105 A 6/1985 Jose et al.
4,692,606 A * 9/1987 Sakai et al. ..... 250/205
5,508,650 A 4/1996 Grimm et al.
5,936,446 A 8/1999 Lee
6,286,127 B1 9/2001 King et al.
6,424,211 B1 7/2002 Nolan et al.

* cited by examiner

*Primary Examiner*—Shawn Riley
(74) *Attorney, Agent, or Firm*—Fogg & Powers LLC

(57) ABSTRACT

A user-programmable bi-directional, constant current generator circuit allows external programming of either a positive (+) or a negative (−) polarity output current, for injection into one of two locations of the PWM controller circuit of a DC-DC voltage converter. The parameters of the DC-DC converter's offset voltage will depend upon the connection of a single programming pin to one of two programming resistors. The programming resistors are respectively referenced to different supply rail voltages (VCC and VSS). The polarity of the offset additionally depends upon where, within the PWM-controlled DC-DC converter, the programmed constant current is injected.

20 Claims, 2 Drawing Sheets

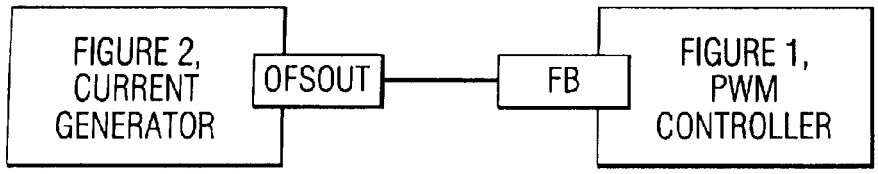
FIG. 3
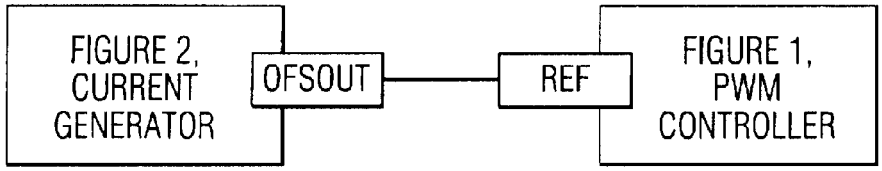
FIG. 4
| OFSOUT CONNECTED TO: | RESISTOR R5 OR R6 USED: | OFFSET POLARITY |
|---|---|---|
| FB | R5 | (−) |
| FB | R6 | (+) |
| REF | R5 | (+) |
| REF | R6 | (−) |
FIG. 5
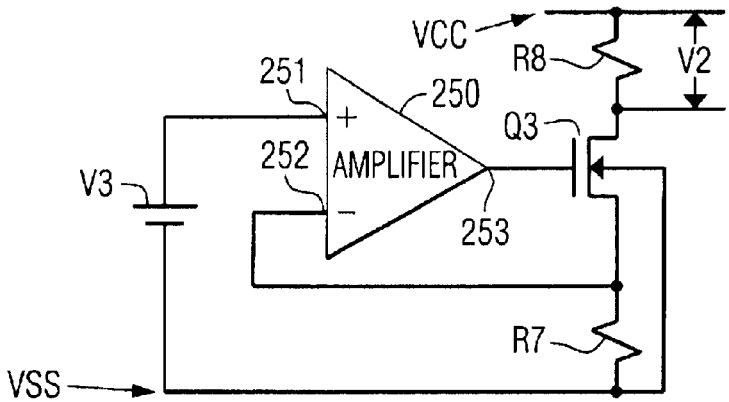
FIG. 6

METHOD OF SETTING BI-DIRECTIONAL OFFSET IN A PWM CONTROLLER USING A SINGLE PROGRAMMING PIN

Matter enclosed in heavy brackets [ ] appears in the original patent but forms no part of this reissue specification; matter printed in italics indicates the additions made by reissue.

FIELD OF THE INVENTION

The present invention relates in general to electronic circuits and components therefor, and is particularly directed to a new and improved constant current generator circuit-based arrangement for providing a programmable bi-directional voltage offset for a pulse width modulation controller (PWM) of a PWM-based DC-DC converter.

BACKGROUND OF THE INVENTION

FIG. 1 diagrammatically illustrates the configuration of a conventional pulse width modulation (PWM) controlled DC-DC power converter. As shown therein a voltage terminal 10 is coupled to receive a reference voltage V1, such as that supplied by a digital-to-analog converter (DAC). This reference voltage is coupled to a reference terminal pin REF through a filter 11, such as that comprised of a resistor R4 and capacitor C3. The voltage terminal REF, in turn, is coupled to the non-inverting (+) input 21 of an operational amplifier (OP AMP) 20. The output 23 of the OP AMP is coupled to a PWM generator circuit 30, the output 33 of which is coupled through an inductor (L1) 40 to an output node 50.

The PWM generator circuit's output 33 is fed back as an output VOUT to the inverting (−) input 22 of amplifier 20 through a filter 60 containing a series resistor R2 coupled to a feedback path FB to the output 23 of the amplifier 20, and through a series connection of a capacitor Cl and a resistor R1 to a node COMP, that receives an amplified and filtered error signal from the amplifier 20. The PWM generator circuit 30 drives a load (represented by a resistor R3) coupled to the output node 50. The COMP terminal controls the PWM generator in a direction to minimize the difference between the voltage REF and the voltage VOUT.

PWM-based DC power supply integrated circuits are often required to have a user adjustable offset. Specifically, in some applications it may be desirable to have the output voltage generated at the output node VOUT different from the input reference voltage V1 by a prescribed (e.g., user-programmable) offset value. Depending upon the application, it may be necessary that this offset voltage be bi-directional, and must be repeatable and stable. Generating this offset should require a minimum number of external components, should not be dependent on other factors such as power supply voltage and, for economy of packaging, should require the least number of integrated circuit pins. In addition, to alleviate the design of supporting components, the offset should not require a stable current reference, but only a stable voltage reference (such as a bandgap voltage reference).

SUMMARY OF THE INVENTION

In accordance with the present invention, these objectives are successively achieved by a constant current generator circuit that is configured to allow external programming of either a positive (+) or a negative (−) polarity output current, that is readily injected into one of two locations of the PWM controller circuit of a DC-DC voltage converter. As will be described, the parameters of the DC-DC converter's offset voltage will depend upon the connection of a single programming pin to one of two programming resistors. The programming resistors are respectively referenced to different supply rail voltages (VCC and VSS), on the one hand, and will also depend upon where, within the PWM-controlled DC-DC converter, the programmed constant current is injected.

The user-programmable, bi-directional constant current generator contains first and second operational amplifiers that drive associated complementary switching devices (such as PMOSFET and NMOSFET switches). The input of one of the amplifiers is coupled to a first DC voltage referenced to a first DC power supply rail (e.g., VCC). The input of the other amplifier is coupled to a second DC voltage referenced to another supply rail (e.g., VSS or ground). The current flow paths through the two switching devices are coupled in series between an offset input terminal to which a programming input pin is coupled and an offset current output terminal.

The first programming resistor is coupled between the VCC supply rail and a first programming pin; the second programming resistor is coupled between the VSS supply rail and a second programming pin. By selectively connecting the programming input pin to one of the first and second programming pins (and thereby to their associated resistors), the bi-directional constant current generator is user-programmed to supply one of a positive polarity and negative polarity offset current to the offset current output terminal.

In a first, 'sourcing' current programming mode, the first programming pin is coupled to the programming input pin, while the second programming pin is open. As a result, that one of the amplifiers which is coupled to the first programming resistor, will cause its associated switching device to conduct. With its associate switching device conducting, that amplifier attempts to drive the voltage at its input port to match that amplifier's reference voltage. At the same time, the other amplifier maintains its associated switching device in the off state. With the one amplifiers' switching device turned on, a sourcing current will flow from the supply rail through the first programming resistor, the single programming terminal and the current path of the turned-on switch to the current source's output terminal. The magnitude of this current is effectively equal to the reference voltage divided by its associated series resistor.

In a second, 'sinking' current programming mode, the second programming pin is coupled to the programming input pin, while the first programming pin is open. As a result, the second amplifier will cause its associated switching device to conduct, while the one amplifier maintains its switching device in the off state. The second amplifier attempts to make voltage at the input port match that amplifier's reference voltage. With the second amplifiers' switching device turned on, a sinking current will flow from a supply rail through the second programming resistor, the single programming terminal and the current flow path of the second amplifier's associated turned-on switch to the output terminal. The magnitude of the sinking current is effectively equal to the reference voltage divider by its associated series resistor.

A selected one of these 'sourcing' and 'sinking' currents as generated by the user-programmable, bi-directional constant current generator of the invention is connectable to either of two locations in the PWM controller of the PWM switching DC power supply to provide a constant offset voltage. The reference voltages employed within the constant current source may be based upon a bandgap voltage (referenced to VSS or ground (GND)). In a non-limiting, but preferred embodiment, the first reference voltage (referenced to VCC) may be derived from the second voltage (referenced to VSS)

BRIEF DESCRIPTION OF THE DRAWINGS

FIG. 3 illustrates a first implementation of interconnecting the single pin-programmable, bi-directional offset generator circuit of FIG. 2 with the PWM switching DC power supply of FIG. 1; and FIG. 4 a second implementation of interconnecting the single pin-programmable, bi-directional offset generator circuit of FIG. 2 with the PWM switching DC power supply of FIG. 1;

FIG. 5 shows a Table associating the polarity of the offset voltage for the choice of programmable parameters of the single pin-programmable, bi-directional offset generator circuit of FIG. 2 and its interconnections to the PWM switching DC power supply of FIGS. 3 and 4; and FIG. 6 diagrammatically illustrates non-limiting embodiment of a circuit for deriving the respective reference voltages V2 and V3 used in the single pin-programmable, bi-directional offset generator circuit of FIG. 2.

DETAILED DESCRIPTION

Before describing the programmable bi-directional voltage offset generator circuit in accordance with the invention, it should be observed that the invention resides primarily in an arrangement of conventional DC power supply circuits and control components therefor, and the manner in which they are integrated together. It is to be understood that the invention may be embodied in a variety of implementations, and should not be construed as being limited to only those shown and described herein. For example, although the non-limiting circuit implementations of the Figures shows the use of MOSFET devices to perform controlled switching operations, it will be appreciated that the invention is not limited thereto, but also may be configured of alternative equivalent circuit devices, such as, bipolar transistors. The implementation example to be described is intended to furnish only those specifics that are pertinent to the present invention, so as not to obscure the disclosure with details that are readily apparent to one skilled in the art having the benefit of present description. Throughout the text and drawings like numbers refer to like parts.

Figure 1:
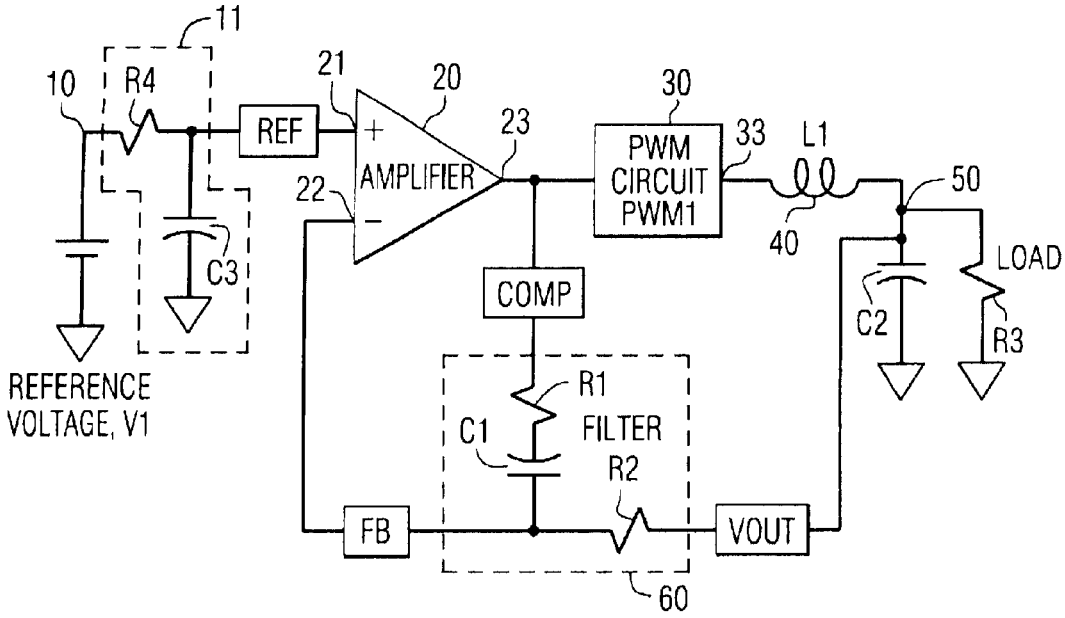
FIG. 1 PRIOR ART
FIG. 1 diagrammatically illustrates the configuration of a conventional pulse width modulated (PWM) switching DC power supply.
Figure 2:
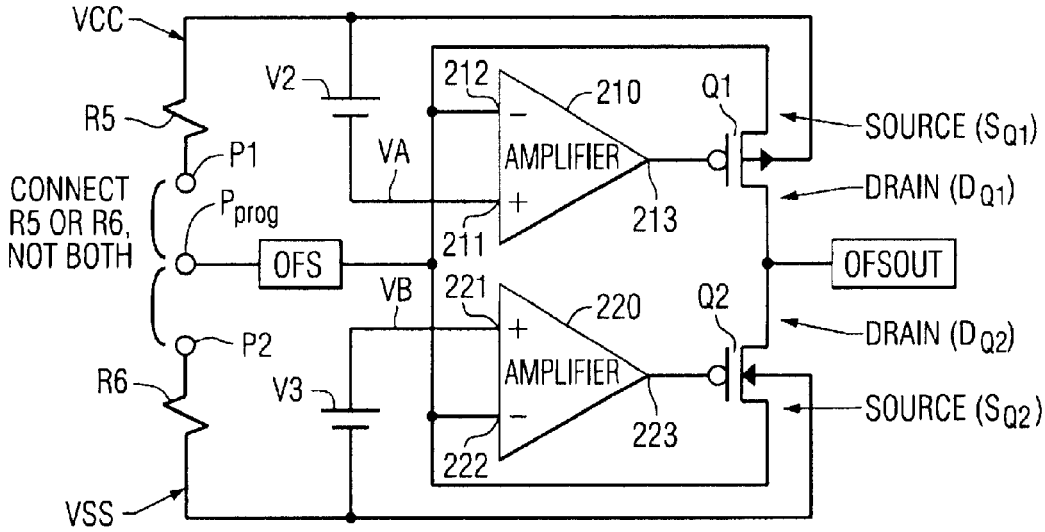
FIG. 2 diagrammatically shows an embodiment of a single pin-programmable, bi-directional offset generator circuit in accordance with the invention.

Attention is now directed to FIG. 2, which diagrammatically shows an embodiment of a single pin-programmable, bi-directional offset generator circuit in accordance with the invention, and being configured to be readily interfaced with the PWM controller of a DC-DC converter of the type shown in FIG. 1, described above. As shown in FIG. 2, the offset generator comprises a bi-directional constant current generator, containing first and second complementary polarity-based amplifiers 210 and 220, respectively. The first or upper amplifier 210 has its non-inverting (+) input 211 referenced via a first voltage V2 to an upper voltage (VCC) rail, and its output 213 coupled as a switch-control input to the gate of a first output switching device, shown as PMOSFET Q1. In a complementary manner, the second or lower amplifier 220 has its non-inverting (+) input 221 referenced via a second DC voltage V3 to a lower voltage (VSS) rail, and its output 223 coupled as a switch-control input to the gate of a second output switching device, shown as NMOSFET Q2.

MOSFETs Q1 and Q2 have their source-drain paths coupled in series between a user-programmable offset input terminal OFS and an offset output terminal OFSOUT. A first, programming resistor R5 is coupled between the upper (VCC) supply rail and a first programming pin P1, while a second programming resistor R6 is coupled between the lower (VSS) supply rail and a second programming pin P2. As will be described, by selectively connecting programming pin, Pprog to which the input terminal OFS is connected, to one of the first and second programming pins P1 and P2, the bi-directional constant current generator is user programmed to supply either a positive polarity or a negative polarity offset current to the OFSOUT terminal.

The OFS terminal is coupled to the respective inverting (−) inputs 212 and 222 of respective amplifiers 210 and 220, and also to the source $S_{Q1}$ of PMOSEET Q1 and to the source $S_{Q2}$ of NMOSFET Q2. The OFSOUT terminal is coupled to the commonly connected drains $D_{Q1}$ and $D_{Q2}$ of MOSFETS Q1 and Q2. It should be noted that the source and drain connections of the MOSFETs may be interchanged. The body of PMOSFET Q1 is coupled to VCC and the body of NMOSFET Q2 is coupled to VSS to avoid parasitic conduction paths.

The operational parameters of the circuit of FIG. 2 are as follows. The values of the DC voltages V2 and V3 are constrained such that the voltage VA applied to the non-inverting (+) input 211 of amplifier 210 is higher than voltage VB at the non-inverting (+) input 221 of amplifier 220. Also, the voltage VA must be higher than the voltage at the output terminal OFSOUT, when resistor R5 is used (the OFS terminal is coupled to programming pin P1) and the voltage VB must be lower than the voltage at the output OFSOUT when the resistor R6 is used (the OFS terminal is coupled to programming pin P1).

In operation, in a first, 'sourcing' current programming mode, in which the programming pin Prog is connected to pin P1, resistor R5 is connected between VCC and terminal OFS, while pin P2 remains open. With this connection, the output 213 of amplifier 210 will drive the gate of PMOSFET Q1 low causing PMOSFET Q1 to conduct. With MOSFET Q1 conducting, amplifier 210 attdempts to drive the voltage terminal OFS at its inverting (−) input terminal 212 so as to match the voltage VA at its non-inverting (+) input terminal 211. With PMOSFET Q1 being turned on by amplifier 210, a sourcing current will flow from the supply rail VCC through resistor R5, terminal OFS, the source-drain path of PMOSFET Q1 to the output terminal OFSOUT. The magnitude of this current $I_{OFSOUT}$ is V2/R5.

With terminal OFS driven to equal the voltage VA, and with the voltage VA constrained to be higher than VB, then the voltage at the inverting (−) input 222 of amplifier 220 is higher than at the non-inverting (+) input 221. Amplifier 220 will then drive its output 223, the gate of MOSFET Q2, low, shutting MOSFET Q2 off. The current from OFSOUT is therefore defined exclusively by V2/R5.

In a second, 'sinking' current programming mode, in which programming pin Prog is connected in pin P2, resistor R6 is connected between VSS and terminal OFS, while pin P1 is open. With this connection, the output 223 of amplifier 220 will drive the gate of NMOSFET Q2 high, causing NMOSFET Q2 to conduct. In this condition amplifier 220 attempts to drive the voltage terminal OFS at its inverting (−) input terminal 222 so as to match the voltage VA at its non-inverting (+) input terminal 211. With NMOSFET Q2 being turned on by amplifier 220, a sinking current will flow from the supply rail VSS through resistor R6, terminal OFS, the source-drain path of NMOSFET Q2 to the output terminal OFSOUT. The magnitude of this current $I_{OFSOUT}$ is equal to V3/R6.

With terminal OFS driven to equal the voltage VB, and with the voltage VB constrained to be lower than the voltage VA, then the inverting (−) input 212 of amplifier 210 is lower than the non-inverting (+) input 211. Amplifier 210 will then drive its output 210, the fate of PMOSFET Q1, high, shutting MOSFET Q1 off. The current from OFSOUT is therefore defined exclusively by V3/R6.

The sourcing or sinking current generated by the constant current generator of FIG. 2 can be connected to the PWM controller of the PWM switching DC power supply of FIG. 1 to provide a constant offset voltage. FIG. 3 illustrates one implementation of interconnecting the two circuits, wherein the OFSOUT terminal of the constant current generator of FIG. 2 is coupled to the feedback path FB of the PWM switching DC power supply of FIG. 1. The injection of this constant (source or sinking) current creates an associated voltage drop across the resistor R2 in the PWM-based DC-DC power supply of FIG. 1, thereby shifting the voltage VOUT by a value corresponding to the product of the resistance of resistor R2 and the current $I_{OFSOUT}$ injected at terminal FB.

If the direction of current flow is out of the output pin OFSOUT, the resulting voltage drop $V_{R5}$ across resistor R5 will make the voltage at point FB higher than at VOUT. In response to this voltage increase at its inverting (−) input terminal 222, amplifier 220 will reduce its output voltage and thereby the voltage VOUT, so as to bring the voltage at FB back into balance with the voltage at REF. Conversely, if the direction of current flow is into the output pin OFSOUT, the resulting voltage drop $V_{R5}$ across resistor R5 will make the voltage at point FB lower than at VOUT. In response to this voltage decrease at its inverting (−) input terminal 222, amplifier 220 will increase its output voltage and thereby the voltage VOUT, so as to bring the voltage at FB back into balance with the voltage at REF.

It should be noted that the difference or offset voltage between the voltages at FB and VOUT is equal to the product of the value of resistor R2 times the output current $I_{OFSOUT}$. Also, $I_{OFSOUT}$ is equal to V2/R5 or V3/R6. The magnitude of the offset voltage is therefore equal to V2XR2/R5 or V3XR2/R6. In a typical PWM controller integrated circuit, the voltages V1, V2 and V3 are internally generated and stable, while resistors R2, R5, and R6 are stable external components.

A second implementation of interconnecting the circuits of FIGS. 1 and 2 is shown in FIG. 4, wherein the OFSOUT terminal of the constant current generator of FIG. 2 is coupled to the reference terminal pin REF of the PWM switching DC power supply of FIG. 1. The injection of the constant (source or sinking) current $I_{OFSOUT}$ creates an associated voltage drop across the input resistor R4 in the PWM-based DC-DC power supply of FIG. 1, as the current $I_{OFSOUT}$ must flow through resistor R4 to reference voltage V1, as there is no other DC path available (capacitor C3 blocks the path to VSS, while the input to amplifier 20 is high impedance).

In the embodiment of FIG. 4, the current $I_{OFSOUT}$ will create a voltage drop across the resistor R4 of the PWM-controlled DC-DC converter of FIG. 1, causing the DC voltage at terminal REF to be different from the DC voltage of reference voltage V1. If the $I_{OFSOUT}$ flows out of terminal OFSOUT, the voltage at terminal REF will be higher than the voltage V1, increasing the voltage applied to the non-inverting (+) input 21 of amplifier 20. In response to this voltage increase, amplifier 20 increases the voltage at terminal VOUT to make the voltage at FB match the voltage at REF.

On the other hand, if the current $I_{OFSOUT}$ flows into terminal OFSOUT, the voltage at terminal REF will be lower than the voltage V1, decreasing the voltage applied to the non-inverting (+) input 21 of amplifier 20. In response to this voltage drop, amplifier 20 will decrease the voltage at terminal VOUT to make the voltage at FB match the voltage at REF. The offset or difference voltage between the voltage V1 and the voltage at REF is equal to the product of the current $I_{OFSOUT}$ times the value of the resistor R4. Also, the current $I_{OFSOUT}$ is equal to V2/R5 or V3/R6. The value of the offset voltage is therefore equal to V2XR4/R5 or V3XR4/R6.

From the above description, it will be appreciated that the polarity of the offset voltage, namely the polarity of VOUT referenced to V1, is dependent upon the choice of the programming resistor (either R5 or R6) of the constant current generator of FIG. 2, and also the pin of FIG. 1 to which the OFSOUT of FIG. 2 is connected (either FB or REF). The polarity of the offset voltage for the choice of these programmable parameters is shown in the Table of FIG. 5.

The voltage V3 of the constant current source of FIG. 2 may typically be implemented as a bandgap voltage (referenced to VSS or ground (GND)). The voltage V2, referenced to VCC, may be derived from the voltage V3. A non-limiting embodiment of a circuit for deriving the voltage V2 from the (bandgap-based) voltage V3 is shown in FIG. 6, as comprising an operational amplifier 250 having its non-inverting (+) input 251 coupled to the positive side of voltage source V3.

Amplifier 250 has its output 253 coupled to drive the gate of NMOSFET Q3. NMOSFET Q3 has its source-drain path, coupled in series with a first resistor R7 to the Vss supply rail and a second resistor R8 coupled to the VCC supply rail. The voltage V2 is derived across resistor R8. The connection between the source/drain of PMOSFET Q3 and resistor R7 is coupled to the inverting (−) terminal 252 of amplifier 250. In operation, amplifier 250 drives PMOSFET Q3 to make the voltage drop VR7 across resistor R7 equal to the voltage V3. This produces a current equal to V3/R7, which is applied to resistor R8, producing a voltage V2 equal to (V3*R8)/R7.

As will be appreciated from the foregoing description, the single pin-programmable, bi-directional offset generator circuit of the present invention readily enables a PWM-based DC power supply circuit to supplied with a user selectable positive or negative polarity output current. Depending upon the (single pin) programming of the current generator and the point of injection of its output current into the PWM controller circuit, the DC-DC converter will operate at predetermined offset voltage.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. An apparatus for generating a regulated direct current (DC) voltage comprising:

a DC-DC converter operative to generate a regulated DC output voltage derived from a supply voltage, said DC-DC converter having a pulse width modulation (PWM) generator which generates a PWM-based output voltage at an output node thereof, said output voltage being coupled through an inductor element to an output voltage terminal for application to a load;

a PWM controller for controlling the operation of said PWM generator, said PWM controller including an operational amplifier having a first input coupled to receive a reference voltage, a second input, and an output coupled to said PWM generator, and a current feedback resistor coupled between said output node and said second input of said operational amplifier; and a user-programmable bi-directional, constant current generator circuit for controlling the operation of said PWM controller, and being configured to generate a user-programmable one of a positive (+) or a negative (−) polarity current, and to supply said a user-programmable current to a user-selected location of said PWM controller for controlling the operation of said PWM generator.

2. The apparatus according to claim 1, wherein said user-programmable bi-directional, constant current generator circuit comprises first and second operational amplifiers that drive associated switching devices, said first operational amplifier is coupled receive a first DC voltage referenced to a first DC power supply rail, and said second operational amplifier is coupled to receive a second DC voltage referenced to a second DC supply rail, current flow paths through said switching devices are coupled in series between an offset input terminal, to which a programming input pin is coupled and an offset current output terminal from which said user-programmable one of a positive (+) or a negative (−) polarity current is derived, and said programming input pin is coupled through a selected one of a first programming resistor to said first DC voltage supply rail, and a second programming resistor to said second DC voltage supply rail.

3. The apparatus according to claim 2, wherein, for either a current-sourcing or a current-sinking mode, said programming input pin is coupled through said first programming resistor to said first DC voltage supply rail, causing said first operational amplifier to drive its switching device to conduct, so that said first operational amplifier attempts to make the voltage at its input match said first reference voltage, while said second operational amplifier maintains said second switching device in the off state, whereby a current will flow between said first DC supply rail through said first programming resistor, said input programming terminal and the current path of the turned-on first switching device, said offset current output terminal and said user-selected location of said PWM controller.

4. The apparatus according to claim 3, wherein for said current-sourcing mode, said user-selected location of said PWM controller to which said offset current output terminal is applied corresponds to said first input of said operational amplifier of said PWM controller.

5. The apparatus according to claim 3, wherein for said current-sinking mode, said user-selected location of said PWM controller to which said offset current output terminal is applied corresponds to said second input of said operational amplifier of said PWM controller.

6. The apparatus according to claim 2, wherein, for either a current-sourcing or a current-sinking mode, said programming input pin is coupled through said second programming resistor to said second DC voltage supply rail, causing said second operational amplifier to drive its switching device to conduct, so that said second operational amplifier attempts to make the voltage at its input match said second reference voltage, while said first operational amplifier maintains said first switching device in the off state, whereby a current will flow between said second supply rail through said second programming resistor, said input programming terminal and the current path of the turned-on second switching device, said offset current output terminal and said user-selected location of said PWM controller.

7. The apparatus according to claim 6, wherein for said current-sourcing mode, said user-selected location of said PWM controller to which said offset current output terminal is applied corresponds to said second input of said operational amplifier of said PWM controller.

8. The apparatus according to claim 6, wherein for said current-sinking mode, said user-selected location of said PWM controller to which said offset current output terminal is applied corresponds to said first input of said operational amplifier of said PWM controller.

9. The apparatus according to claim 2, further including a bandgap voltage generator circuit that is operative to generate said first and second DC voltages for application to said first and second operational amplifiers, respectively.

10. A method of generating a regulated direct current (DC) voltage, comprising the steps of:

(a) providing a DC converter controlled by a pulse width modulation (PWM) generator which generates a PWM based output voltage at an output node thereof that is coupled through an inductor element to an output voltage terminal for application to a load; and (b) controlling the operation of said PWM generator by performing the steps of:

1- providing an operational amplifier having a first input coupled to receive a voltage reference, a second input and an output coupled to said PWM generator, 2- coupling a current feedback resistor between said output node and said second input of said operational amplifier, 3- generating a user-programmable one of a positive (+) or a negative (−) polarity constant current, and 4- supplying said user-programmable one of a positive (+) or a negative (−) polarity constant current to a user-selected location of said PWM generator.

11. The method according to claim 10, wherein step (b)3 comprises:

providing first and second operational amplifiers that drive associated switching devices, said first operational amplifier being coupled to receive a first DC voltage referenced to a first DC power supply rail, and said second operational amplifier being coupled to receive a second DC voltage referenced to a second DC supply rail, current flow paths through said switching devices being coupled in series between an offset input terminal, to which a programming input pin is coupled, and an offset current output terminal from which said user-programmable one of a positive (+) or a negative (−) polarity current is derived, and wherein said programming input pin is coupled through a selected one of a first programming resistor to said first DC voltage supply rail and a second programming resistor to said second DC voltage supply rail.

12. The method according to claim 11, wherein, in step (b)4, for either a current-sourcing or a current-sinking mode, said programming input pin is coupled through said first programming resistor to said first DC voltage supply rail, causing said first operational amplifier to drive its switching device to conduct, so that said first operational amplifier attempts to make the voltage at its input match said first reference voltage, while said second operational amplifier maintains said second switching device in the off state, whereby a current flows between said first DC supply rail through said first programming resistor, said input programming terminal and the current path of the turned-on first switching device, said offset current output terminal and said user-selected location of said PWM controller.

13. The method according to claim 12, wherein step (b)4 corresponds to said current-sourcing mode, and wherein said user-selected location of said PWM controller to which said offset current output terminal is applied corresponds to said first input of said operational amplifier of said PWM controller.

14. The method according to claim 12, wherein step (b)4 corresponds to current-sinking mode, and wherein said user-selected location of said PWM controller to which said offset current output terminal is applied corresponds to said second input of said operational amplifier of said PWM controller.

15. The method according to claim 11, wherein, in step (b)4, for either a current-sourcing or current-sinking' mode, said programming input pin is coupled through said second programming resistor to said second DC voltage supply rail, causing said second operational amplifier to drive its switching device to conduct, so that said second operational amplifier attempts to make the voltage at its input match said second reference voltage, while said first operational amplifier maintains said first switching device in the off state, whereby a current will flow between said second supply rail through said second programming resistor, said input programming terminal and the current path of the turned-on second switching device, said offset current output terminal and said user-selected location of said PWM controller.

16. The method according to claim 15, wherein step (b)4 corresponds to current-sourcing mode, and wherein said user-selected location of said PWM controller to which said offset current output terminal is applied corresponds to said second input of said operational amplifier of said PWM controller.

17. The method according to claim 15, wherein step (b)4 corresponds to current-sinking mode, and wherein said user-selected location of said PWM controller to which said offset current output terminal is applied corresponds to said first input of said operational amplifier of said PWM controller.

18. The method according to claim 11, wherein step (b)3 includes generating said first and second DC voltages from a bandgap voltage generator circuit.

19. A user-programmable constant current generator circuit comprising:

an input terminal;

an output terminal from which a user-programmable constant current is derived;

a first operational amplifier having a first input coupled to receive a first DC voltage referenced to a first power supply rail, a second input, and an output coupled to drive an associated first switching device;

a second operational amplifier having a first input coupled to receive a second DC voltage referenced to a [first] *second* power supply rail, a second input, and an output coupled to drive an associated second switching device;

said first and second switching devices having current flow paths therethrough coupled between said input terminal and said output terminal; and a [first] programming [resistor] *input pin* coupling said input terminal to one of said first and second power supply rails.

20. The user-programmable constant current generator circuit according to claim 19, further including a bandgap voltage generator circuit that is operative to generate said first and second DC voltages for application to said first and second operational amplifiers, respectively.

* * * * *